United States Patent
Roze et al.

(10) Patent No.: US 6,252,394 B1
(45) Date of Patent: Jun. 26, 2001

(54) ROTARY MOVEMENT SENSOR EQUIPPED WITH MEANS OF ASSEMBLY WITH A DRIVE SHAFT DESIGNED TO MINIMIZE THE EFFECTS OF A MISALIGNMENT IN THE CONNECTION

(75) Inventors: Pierre Roze, Caluire et Cuire; Denis Faure, Miribel, both of (FR)

(73) Assignee: L'Electricfil Industrie, Lyons (FR)

( * ) Notice: Subject to any disclaimer, the term of this patent is extended or adjusted under 35 U.S.C. 154(b) by 0 days.

(21) Appl. No.: 09/209,765

(22) Filed: Dec. 11, 1998

(30) Foreign Application Priority Data

Dec. 12, 1997 (FR) .................................................. 97 16045

(51) Int. Cl.⁷ .............................. G01B 7/14; G01R 33/07; F16D 3/06
(52) U.S. Cl. ................................ 324/207.12; 324/207.25; 324/207.2; 464/106
(58) Field of Search ......................... 324/207.11, 207.12, 324/207.13, 207.15, 207.2, 207.21, 207.25; 464/106, 113; 403/373

(56) References Cited

U.S. PATENT DOCUMENTS 3,596,943 * 8/1971 Krauss .............................. 287/52.06

FOREIGN PATENT DOCUMENTS

| 4040287 | 6/1992 | (DE) . |
| 4224320 | 1/1994 | (DE) . |
| 0617260 | 9/1994 | (EP) . |
| 9722847 | 6/1997 | (WO) .................................. 73/118.1 |

* cited by examiner

Primary Examiner—Christine Oda
Assistant Examiner—Henry S. Andersen
(74) Attorney, Agent, or Firm—Dennison, Scheiner, Schultz & Wakeman

(57) ABSTRACT

A sensor for detecting the angular position of a rotary drive shaft is disclosed which includes a stator, a rotor connected to the stator by a ball joint and including a moving target, and a drive shaft connected to the rotor. The moving target passes through a detection system and produces a signal as a function of its position. Variations in the sensor output signal due to misalignment of the rotor and the drive shaft are minimized by locating the moving target close to the axis of rotation of the ball joint.

12 Claims, 3 Drawing Sheets

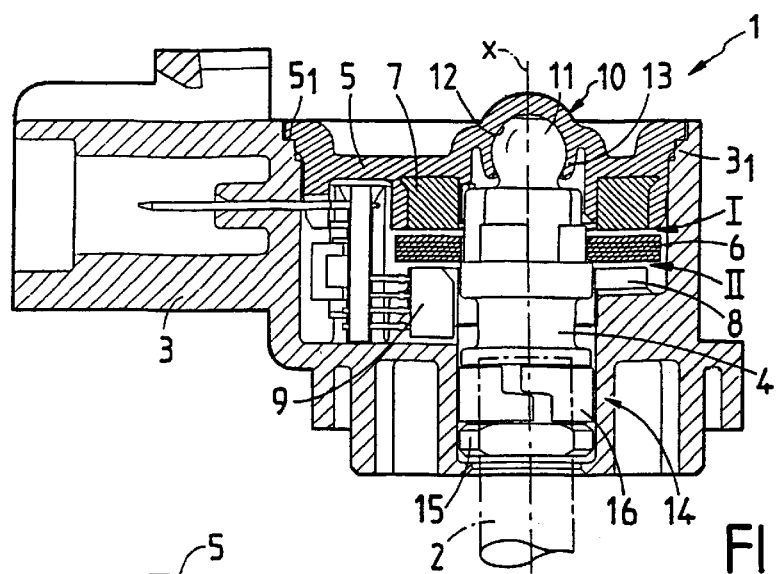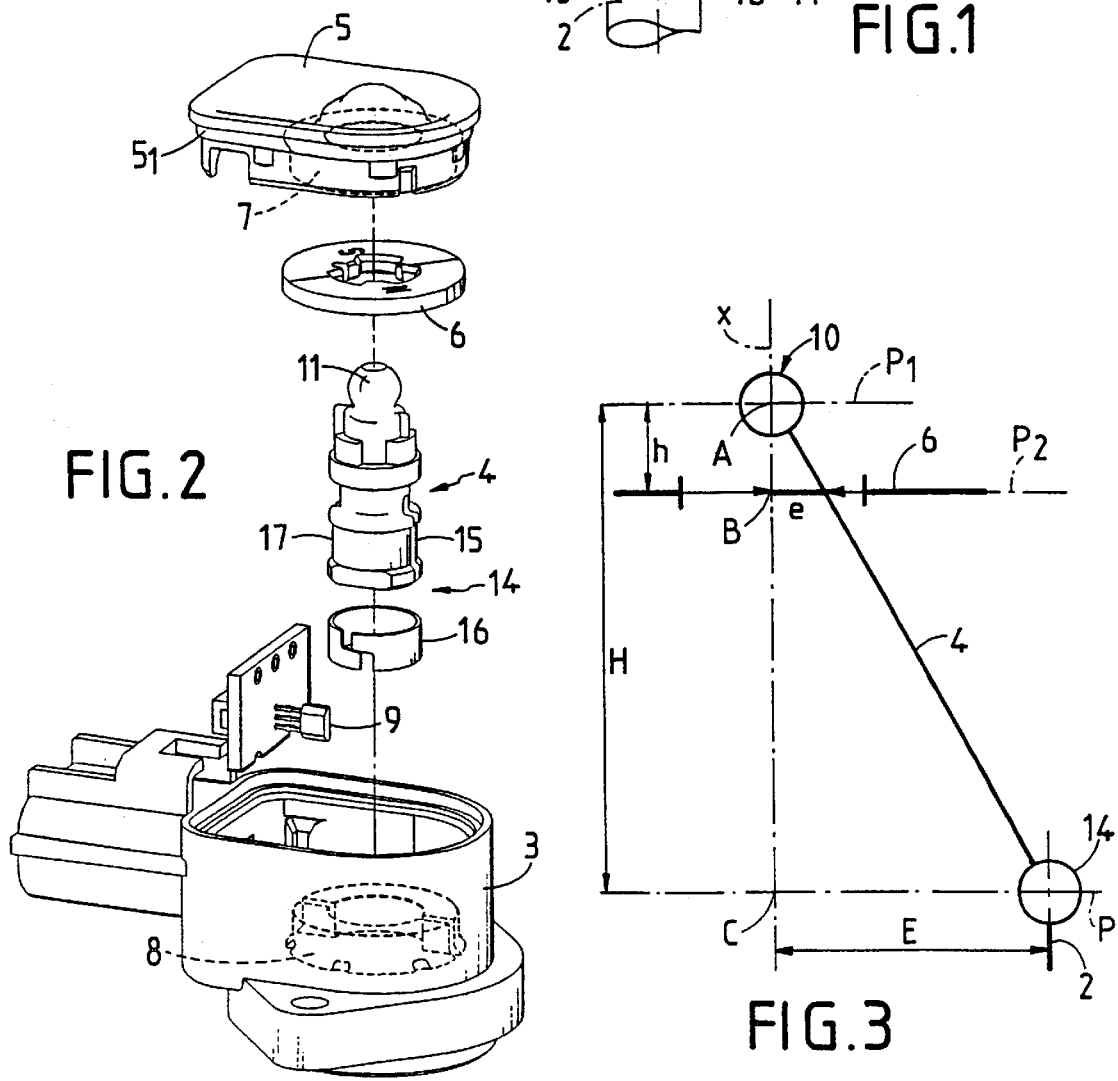
FIG.1
FIG.2
FIG.3

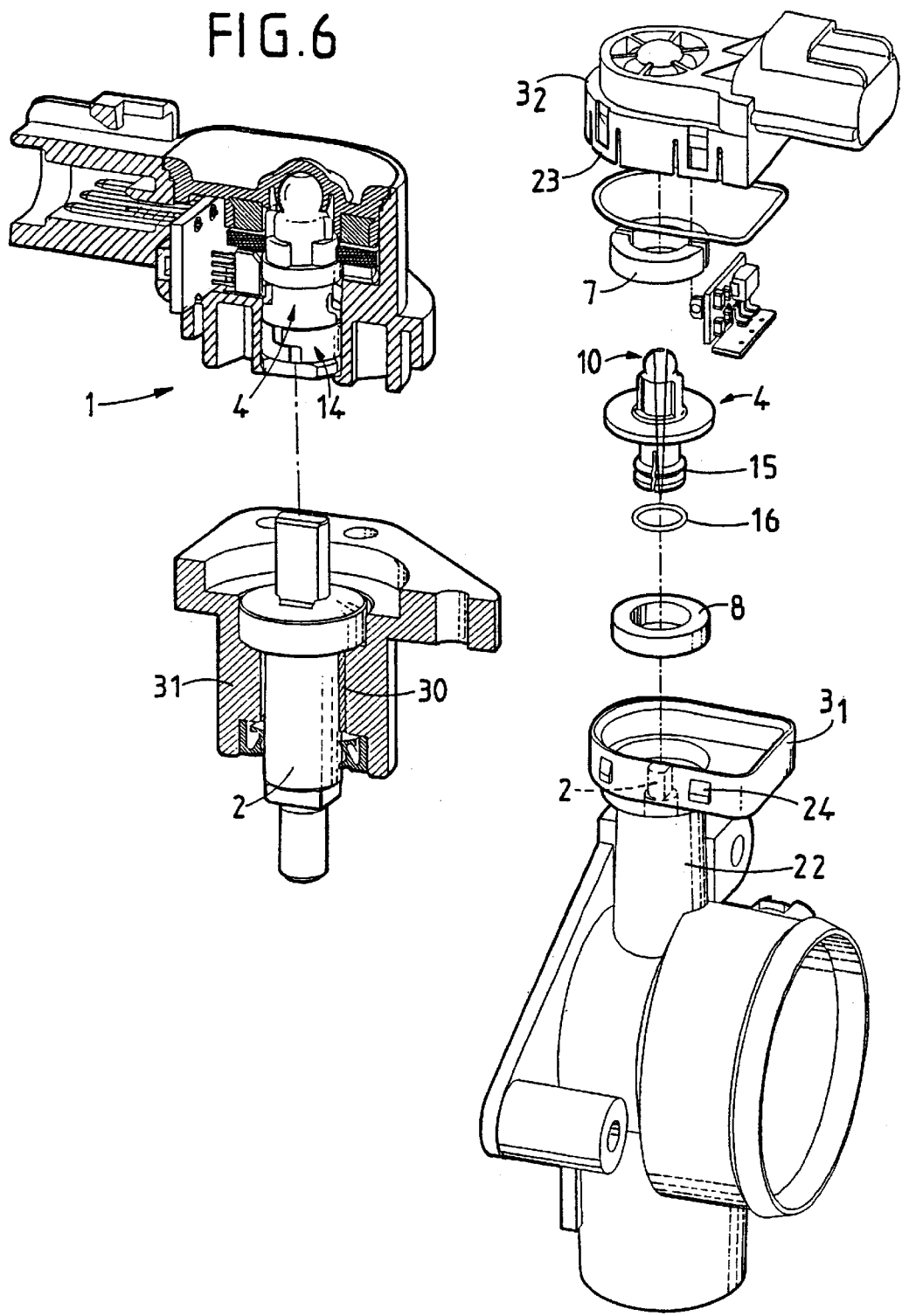

ROTARY MOVEMENT SENSOR EQUIPPED WITH MEANS OF ASSEMBLY WITH A DRIVE SHAFT DESIGNED TO MINIMIZE THE EFFECTS OF A MISALIGNMENT IN THE CONNECTION

BACKGROUND OF THE INVENTION

The subject of the invention relates to the field of rotary movement sensors in the general sense, and is advantageously targeted at contactless rotary movement sensors, characterized by the absence of a mechanical connection between at least one sensitive detection cell and the part whose position, movement, speed or acceleration they measure.

The subject of the invention is more specifically targeted at contactless movement sensors in which the coupling between the moving part and the sensitive cell is established via a magnetic electromagnetic or electrostatic field, the strength of this coupling depending on the relative position of the part and of the sensor.

The subject of the invention finds a particularly advantageous application in the field of contactless rotary movement sensors employing sensitive detection cells of the Hall-effect type.

In the field of contact-type rotary movement sensors, for example of the potentiometer type, a sensor comprises a rotor fitted with brushes that rub along conductive tracks formed on a stator. The rotor is equipped with means of connection or assembly with a drive shaft of a part whose position and/or movement are to be detected.

In the technical field of contactless rotary movement sensors, of the magnetic type, it is known practice for a sensor to be produced that comprises a stator equipped with one or more cells sensitive to magnetic induction or to a variation in magnetic induction, such as Hall-effect cells. Such a sensor also comprises a rotor equipped with a moving target provided with magnetic elements and delimiting at least one coupling gap with the sensitive cells. The detection cells are capable of delivering a signal which is a function of the position and/or movement of the moving element. Conventionally, the rotor of such a sensor is provided with means of connection to a drive shaft of a part whose position and/or movement are to be detected.

A rotary movement sensor of the contact or contactless type requires a mechanical connection to be made, via connecting means, between the rotor and the drive shaft exhibited by the part whose position and/or movement is to be detected. For example, the rotor is generally equipped, by way of connecting means, with a housing which complements the cross section of the drive shaft and which may be of D or I shape.

The mounting of such a sensor consists in making the mechanical connection between the rotor of the sensor and the moving shaft and fixing the casing of the sensor to the support associated with the part whose movement is detected. It has come to light that mounting such a sensor poses a certain number of difficulties. Specifically, it needs to be taken into consideration that, bearing in mind the manufacturing tolerances and functional clearances, there may be a misalignment of the rotor compared with the drive shaft, leading to a change in the position of the rotor with respect to the stator.

For a rotary movement sensor of the contact type, for example of the potentionmeter type, for which the brushes connected to the rotor rub on tracks connected to the stator, this results in operation under abnormal conditions, leading to rapid deterioration, even if the operation of such a sensor is not adversely affected in so far as the electrical contact is still made.

For connectionless rotary movement sensors, particularly magnetic sensors, an axial or radial offset of the rotor with respect to the stator alters the characteristics of the magnetic circuit, particularly as far as the gaps and magnetic leaks are concerned. The variation in the gap of the magnetic circuit leads to a variation in the electric signal delivered by the sensor leading, in particular, to a drop in the linearity of the signal or to a change in the gradient expressing the voltage as a function of the angle through which the rotor has rotated.

BRIEF SUMMARY OF THE INVENTION

The subject of the present invention aims to overcome the abovementioned drawbacks by proposing a new rotary movement sensor designed to minimize, in the operating conditions of the sensor, the influence of the conditions in which the rotor of the sensor and the drive shaft are assembled.

Another subject of the invention is aimed at offering a rotary movement sensor, advantageously of the contactless type, designed to allow variations in gap of the magnetic circuit as a function of mechanical tolerances on the assembly between rotor and drive shaft to be controlled.

To achieve this objective, the sensor for detecting the position and rotational movement of a rotary drive shaft comprises, on the one hand, a stator and, on the other hand, a rotor equipped with means of connection to the drive shaft and with a moving target intended to move past at least one detection system capable of delivering a signal as a function of the position of the moving target.

According to the invention, the sensor comprises:
a ball joint interposed between the stator and the rotor and placed along the axis of the rotor, at a limited given distance from the moving target,
and a rotor equipped, by way of connecting means, with at least two elastic legs urged towards each other by an elastic pin intended to provide the connection to the drive shaft at a point some distance from the joint designed to allow a misalignment of given magnitude between the rotor and the shaft while at the same time obtaining a determined minimum variation in positioning between rotor and stator.

BRIEF DESCRIPTION OF THE DRAWINGS

Various other features will emerge from the description given below with reference to the appended drawings which show, by way of non-limiting examples, some embodiments and implementations of the subject of the invention.

FIG. 1 is a view in section-elevation showing a first embodiment of a movement sensor in accordance with the invention.

FIG. 2 is an exploded perspective view of the sensor illustrated in FIG. 1, illustrating characteristic details of the invention.

FIG. 3 is a diagram illustrating the principle of controlling variations in gap by using the sensor in accordance with the invention.

FIG. 5 is an exploded perspective view illustrating an advantageous detail of the subject of the invention.

FIG. 6 is a perspective view showing another embodiment characteristic of a sensor according to the invention.

DETAILED DESCRIPTION OF THE INVENTION

Figure 4:
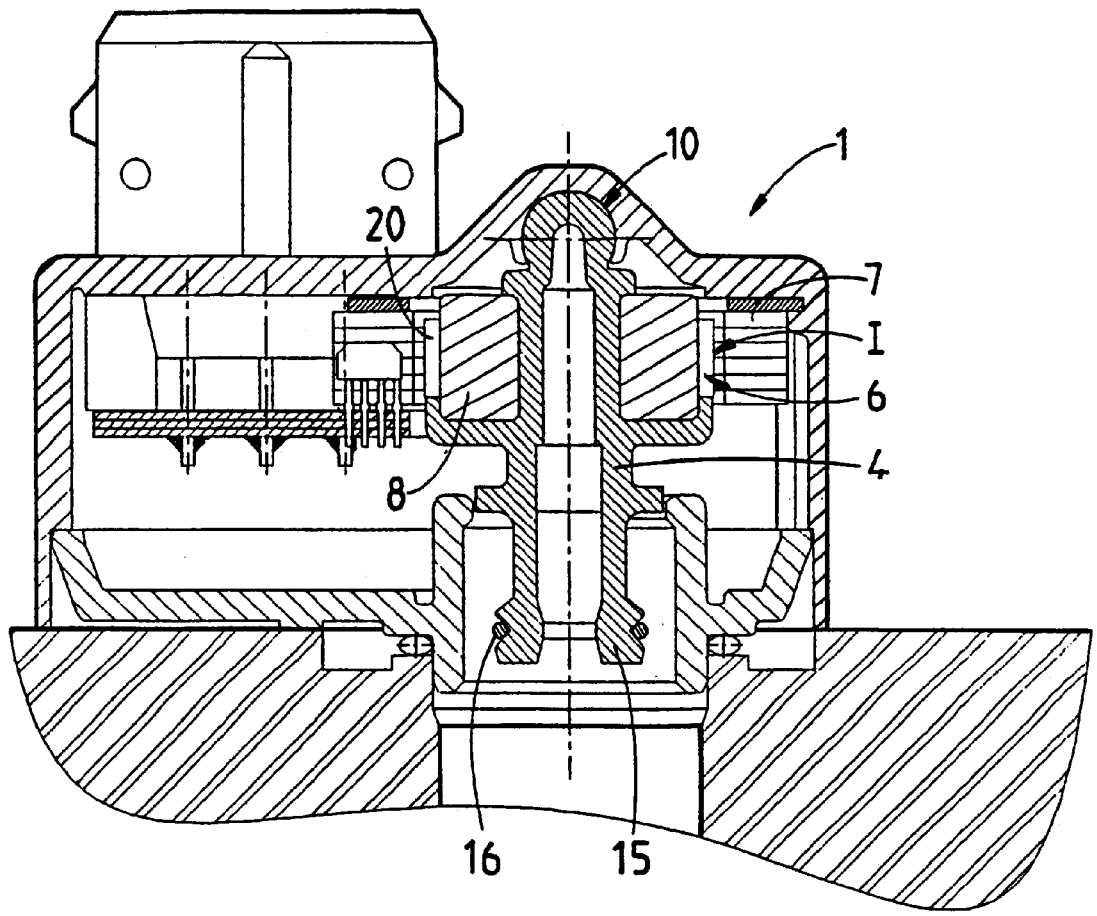
FIG. 4 is a cross section showing another embodiment of a sensor to which the subject of the invention applies.

As emerges more specifically from FIGS. 1 and 2, the sensor, denoted overall by the reference 1, is designed to detect the position and/or movement of a rotary drive shaft 2 forming part of a part in the general sense, not depicted. In the description which follows of a preferred embodiment, the rotary movement sensor 1 according to the invention is of the contactless type, but it should be understood that the subject of the invention applies equally well to a contact-type sensor. In the embodiment illustrated, the sensor 1 is of the magnetic type and employs the principles described in document FR 2,715,726. Of course, the subject of the invention may be applied to any type of rotary movement sensor.

In the embodiment illustrated, the sensor 1 comprises a casing 3 in which a rotor 4 and a stator 5 are mounted. In the embodiment illustrated, the stator 5 forms a cover plate with a stepped peripheral edging $5_1$ resting on complementary ledges $3_1$ formed in the casing. The cover plate 5 is fixed, preferably with sealing, to the casing 3 by any appropriate means, such as by welding.

The rotor 4 comprises a moving target 6 delimiting at least one and, in the example illustrated, two, gaps I, II of a magnetic circuit including a first pole piece 7 and a second pole piece 8. In the example illustrated, the moving target 6 is formed by a magnetized disc defining a gap between each of its transverse faces and the pole pieces 7 and 8 opposite, these being arranged one on each side of the magnetized disc. As is clear from the drawings, the pole pieces 7 and 8 are each built in the form of a ring made of one or more parts and mounted in complementary housings formed respectively in the stator 5 and the casing 3. Note that the magnetized disc 6 can be attached to the rotor 4 or, in an advantageous embodiment, form a single piece produced by the injection-moulding of a material containing magnetic particles.

The moving target 6 is intended to move past or cooperate with a detection system 9 formed, in the example illustrated, by a sensitive cell of the Hall-effect type.

In accordance with the invention, the rotor 4 is mounted on the stator 5 by a ball joint 10 centered on the longitudinal axis x of the rotor. In the example illustrated, the rotor 4 is equipped at one of its end parts with a ball 11 intended to be engaged in a housing 12 of complementary shape formed in the stator 5. According to a preferred alternative form, the housing 12 is delimited, at least in part, by at least two elastic tabs 13 allowing the ball 11 to be immobilized axially, by snap-fastening, inside the housing 12.

According to one feature of the invention, the rotor 4 is equipped, at its opposite end to the end equipped with the ball 11, with means 14 of connection, attachment or assembly with the drive shaft 2. In accordance with the invention, the assembly means 14 are made of at least two elastic legs 15 urged towardss each other by an elastic pin 16. As is clear from the figures, the two elastic legs 15 are diametrically opposed, extending over a limited angular portion, for example of the order of 45°. The elastic legs 15 have an internal face which has a profile which complements the profile of the shaft 2, and an external face on which there is formed a groove 17, centred on the axis x, for housing the elastic pin 16 which is advantageously in the form of an open snap ring which urges the legs towards each other. The clamping achieved by the elastic legs 15 angularly secures the rotor 4 and the drive shaft 2 together. To adapt to suit the cross section of the drive shaft 2, there may be a greater number of elastic legs 15, or the elastic legs may have an internal face that has a different profile.

An examination of FIG. 3 will give a clear understanding of all the advantages of the subject of the invention. It may be considered that the connection between the rotor 4 and the drive shaft 2 is achieved via assembly means 14 at the elastic pin 16. The imaginary plane P in which the elastic pin 16 extends intersects the axis x of the rotor at a point C distant by an amount H from the ball joint 10, the imaginary plane $P_1$ of which is assumed to intersect the axis of the rotor at a point A. Furthermore, it must be understood that the moving target 6 extends in a plane $P_2$ that intersects the axis x of the rotor at a point B, which means that it can be considered that the moving target 6 is placed a given distance h away from the plane $P_1$ of the joint 10. Furthermore, a radial distance E may be defined, this corresponding to a misalignment between the axis x of the rotor 4 and the drive shaft 2. This distance E corresponds, in the plane $P_2$, to a radial shift e of the moving target 6 with respect to the stator which accordingly, in the example illustrated, leads to a variation in gaps I and II. Given the geometric conditions described above, it is possible to define the following ratio: $e/E = h/H$.

It would therefore seem advantageous to minimize the value h, that is to say the distance between the ball joint 10 and the moving target 6 and to maximize the value of H, so as respectively to limit the radial variation e in gap and increase the misalignment E between rotor 4 and drive shaft 2, so as to allow a wide tolerance in the offset between rotor 4 and shaft 2. The combined use of a ball joint 10 a limited given distance h away from the moving target 6 and a connection with the moving shaft 2 at a point as far away as possible from the joint 10, makes it possible to allow a misalignment of given magnitude between the rotor 4 and the shaft 2 while a the same time obtaining a minimum variation in the positional offset e between rotor and stator, at the moving target. Thus, it can be envisaged for the variation in positioning of rotor and stator for which the operation of the sensor is not affected to be controlled by determining the dimensions and tolerances of the various components, on the basis of a choice of the permissible offset e.

In the example described above, the subject of the invention is applied to a sensor which has a moving target produced in the form of a magnetized disc. Of course, the subject of the invention may be employed on other types of sensor. Thus, FIG. 4 illustrates another example of the implementation of the subject of the invention, on a sensor 1 that has a rotor 4 provided with a moving target 6 consisting of a pole piece 8 of annular shape mounted on the rotor and to which there is fixed a magnet 20 that delimits a gap I with the pole piece 7. The way in which the rotor 4 is mounted on the one hand, on the stator 5 by means of the ball joint 10 and, on the other hand, on the drive shaft 2, is identical to the above description.

In the examples described, it should be noted that mounting the various components of the sensor inside the casing 3 is relatively easy to perform because, as emerges more particularly from FIG. 2, it consists in stacking up the parts one on top of the other. In the example illustrated in FIGS. 1 and 2, such a sensor 1 is in the form of a single block made up of the casing 3 and of the cover plate 5 and intended to be mounted by any appropriate means on the support of the part whose movement is to be measured, providing a mechanical assembly between the rotor 4 and the drive shaft 2.

Note that the sensor 1 according to the invention has the advantage, given its design, that it can be fully or partially integrated into the support of the part whose movement is to be detected. Thus, as is clear from FIG. 5, the drive shaft 2 of a part, not depicted, emerges from a support 22 designed to be equipped with a lower half-casing $3_1$ intended to interact with an upper half-casing $3_2$ forming the stator 5. According to an advantageous embodiment feature, the two half-casings $3_1$, $3_2$ are fitted together via at least two elastic tabs 23 formed on one of the half-casings and intended to interact with complementary lugs 24 formed on the other of the half-casings. Joining the two half-casings together may easily be achieved because of the presence of the ball joint 10, which allows the upper half-casing to pivot angularly to allow the lugs and the elastic tabs to snap-fasten together.

In the same perspective, it should be noted that the drive shaft 2 may be directly integrated into the sensor I according to the invention. As emerges more specifically from FIG. 6, the shaft 2 may be mounted on the rotor 4 by connecting means 14 as described hereinabove, and may be guided in its rotation in a bearing 30 formed directly in the sensor casing or, as illustrated in the drawing, in a part 31 attached thereto.

The invention is not restricted to the embodiments described and depicted, because various modifications can be made to it without departing from its scope.

What is claimed is:

1. A sensor for detecting the position and movement of a rotary drive shaft (2), the sensor comprising:
    a stator (5),
    a rotor (4) equipped with connecting means (14) for connecting the rotor to the drive shaft (2) and with a moving target (6) intended to move past at least one detection system (9) capable of delivering a signal as a function of the position of the moving target,
    a ball joint (10) interposed between the stator (5) and the rotor (4) and placed along the axis (x) of the rotor, at a limited given distance (h) from the moving target, and
    the rotor (4) being equipped, by way of the connecting means (14), with at least two eleastic legs (15) urged toward each other by an elastic pin (16) intended to provide a connection to the drive shaft (2) at a point some distance from the ball joint (10) designed to allow a misalignment (E) of given magnitude between the rotor (4) and the shaft (2) while at the same time obtaining a determined minimum variation in positioning between the rotor and the stator.

2. The sensor as claimed in claim 1, wherein the ball joint (10) is formed by a ball (11) borne by one of the ends of the rotor (4) and intended to cooperate with a complementary housing (12) formed in the stator.

3. The sensor as claimed in claim 2, wherein the complementary housing (12) is equipped with elastic tabs (13) which axially hold the ball inside said housing.

4. The sensor as claimed in claim 1, wherein the rotor (4) is equipped with said moving target (6) consisting of a magnetized disk delimiting at least one gap (I, II) with at least one pole piece (7, 8) of the stator.

5. The sensor as claimed in claim 1, wherein the rotor (4) is equipped with said moving target (6) consisting of a magnetized disk attached to the rotor (4) and delimiting at least one gap (I, II) with at least one pole piece (7, 8) of the stator.

6. The sensor as claimed in claim 1, wherein the rotor (4) is equipped with said moving target (6) consisting of a magnetized disk delimiting at least one gap (I, II) with at least one pole piece (7, 8) of the stator and wherein the rotor (4) and the magnetized disk (6) form a single piece produced by the injection-molding of a material containing magnetic particles.

7. The sensor as claimed in claim 2, wherein the stator (5) in which the housing (12) for accommodating the ball is formed forms a cover plate intended to be fixed on a housing (3).

8. The sensor as claimed in claim 2, wherein the stator (5) in which the housing (12) for accommodating the ball is formed forms a cover plate intended to be fixed on a casing (3) and wherein the cover plate (5) is equipped with a pole piece (7) that defines a gap (I) with the moving target (6).

9. The sensor as claimed in claim 2, wherein the stator (5) in which the housing (12) for accommodating the ball is formed forms a cover plate intended to be fixed to a casing (3) and wherein the casing(3) comprises a pole piece (8) defining a gap (II) with the moving target (6).

10. The sensor as claimed in claim 2, wherein the stator (5) in which the housing (12) for accommodating the ball is formed forms a cover plate intended to be fixed to a casing (3), the cover plate being formed by an upper half-casing ($3_2$) intended to be mounted on a lower half-casing ($3_1$).

11. The sensor as claimed in claim 2, wherein the stator (5) in which the housing (12) for accommodating the ball is formed forms a cover plate intended to be fixed to a casing (3), the cover plate being formed by an upper half-casing ($3_2$) intended to be mounted on a lower half-casing ($3_1$) via at least two elastic tabs (23) intended to be snap-fastened with complementary lugs (24).

12. The sensor as claimed in claim 1, wherein the rotor (4) is equipped with a drive shaft (2) guided in rotation in a bearing (30).

* * * * *